United States Patent [19]

Pedersen

[11] Patent Number: 4,791,950
[45] Date of Patent: Dec. 20, 1988

[54] PRESSURE LIMITING VALVE
[75] Inventor: Harry E. Pedersen, Nordborg, Denmark
[73] Assignee: Danfoss A/S, Nordborg, Denmark
[21] Appl. No.: 132,876
[22] Filed: Dec. 14, 1987
[30] Foreign Application Priority Data Jan. 21, 1987 [DE] Fed. Rep. of Germany ....... 3701572

[51] Int. Cl.⁴ .............................................. G05D 16/00
[52] U.S. Cl. .................................................. 137/115
[58] Field of Search ......................... 137/115, 116, 117

[56] References Cited
U.S. PATENT DOCUMENTS 3,455,322 7/1969 Cichester ............................. 137/115
3,687,153 8/1972 Gold .................................... 137/115

Primary Examiner—Alan Cohan
Attorney, Agent, or Firm—Wayne B. Easton; Clayton R. Johnson

[57] ABSTRACT

A pressure limiting valve including a body having an inlet and an outlet coaxially arranged at opposite ends of the body. A discharge passage is disposed in the body between the inlet and outlet. A cylindrical valve element is spring biased to a position to prevent communication between the inlet or outlet and the discharge passage. The valve element includes areas at opposite ends with one area being larger than the other so that pressure in the inlet and outlet act on the valve in a direction opposite the spring bias so as to open the inlet and outlet to the discharge passage upon a predetermined increase in pressure.

17 Claims, 2 Drawing Sheets

PRESSURE LIMITING VALVE

The present invention relates to a pressure limiting valve in accordance with the classifying portion of claim 1.

From the book "Fundamentals of Oil Hydraulics" by Backe, Aachen 1979, page 248, it is known to construct a two-way valve with a housing and a valve element in such a way that the end faces of the valve element exhibit pressure engaging surfaces of different sizes in the closed condition. The term pressure engaging surface here means the surface on which the pressure in the valve acts in the axial direction, i.e. in the direction of movement of the valve element. The valve element comprises a throttle aperture. The pressure engaging surface preceding it is smaller than the pressure engaging surface behind it. The valve elements can therefore only be opened in a flowing fluid. A static pressure in the valve pushes the valve element tightly against the associated valve seat. Any static overpressure can therefore not be limited. In addition, by reason of the pressure drop necessary for operating the valve elements, such valves represent a considerable resistance to the flow of a fluid that is to be conducted through the valve.

Such pressure limiting valves are applicable to hydraulic installations of the most varied kind, for example control circuits, steering a mechanisms or power generating systems.

It is the object of the present invention to provide a pressure limiting valve which is also for static pressure and can be so installed in a pipe conduit that the normal flow of the fluid is not impeded.

This problem is solved in accordance with the invention by means of the features recited in claim 1.

In this construction, the two pressure engaging surfaces are so arranged that, with a uniform pressure within the valve, the latter exerts a force on the valve element that opposes the spring force acting on the valve element. In this way, static pressures may likewise move the valve element to the open position. It is not necessary to actuate the valve by producing a pressure drop in the valve through throttling. The return spring for the valve element can therefore be relatively weak because it need only take up the force resulting from the product of the excess pressure and the difference in area between the two pressure engaging surfaces. The valve may have small external dimensions and is easy to produce.

According to claim 2, the pressure engaging surfaces are preferably arranged at the ends. Relatively small surfaces will suffice.

In a preferred embodiment according to claim 3, the valve element is substantially hollow cylindrical. This hollow cylinder has a throughgoing axial bore which may have a large cross-section because it can extend over practically the entire cross-section of the valve element.

In particular, according to claim 4 its diameter should be larger than half the diameter of the inlet aperture.

The construction according to claim 5 serves to facilitate assembly.

The valve can be in the form of a seating valve and slide valve as is described in more detail in claims 6 et seq.

In a preferred embodiment according to claim 9, the pressure limiting valve may also have a replenishing function. This not only reduces an excess pressure in the valve in that the fluid can flow out through the discharge passage but a vacuum is also eliminated in the valve in that fluid can enter the valve through the discharge passage.

Constructionally preferred solutions are recited in claims 10 and 11.

Further advantages, features and possible applications of the present invention will be evident from the subsidiary claims and the following description of examples in conjunction with the drawing, wherein:

Figure 1:
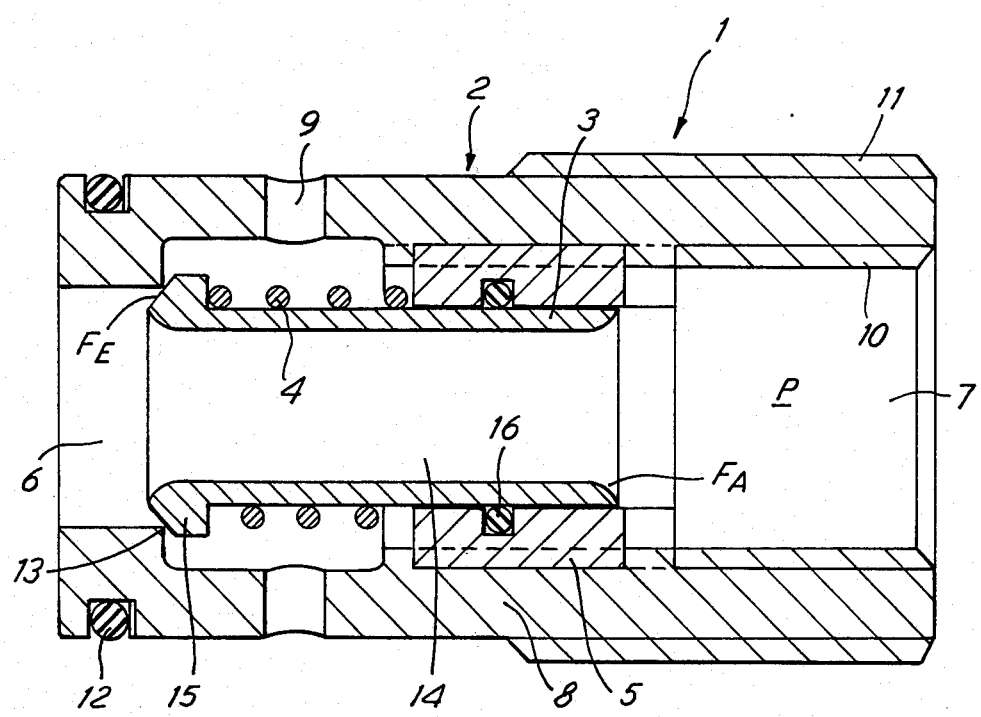
FIG. 1 shows a first embodiment of the pressure limiting valve.

A pressure limint valve 1 comprises a cylindrical housing 2, a cylindrical valve element 3 displaceable therein, as well as a spring 4 disposed between the housing 2 and the valve element 3. The housing 2 has an inlet aperture 6, an outlet aperture 7 opposite thereto, as well as a discharge passage 9 which extends radially in the cylinder wall 8 and consists of several bores. A bushing 5 is screwed into an internal screwthread pin of the housing 2 from the outlet aperture 7. At the end facing the outlet aperture 7, the housing 2 has an external screwthread 11 for screwing into a hydraulic apparatus. At the other end of the housing 2, an O ring 12 is disposed on the outside. In the region of the discharge passage 9, the internal diameter of the housing 2 is enlarged relatively to the diameter of the inlet aperture 6.

At the end of this enlargement facing the inlet aperture, the housing 2 has a valve seat 13 against which the valve element 3 abuts in the rest position under the action of the spring 4. The cylindrical valve element 3 comprises a throughgoing bore 14 of which the diameter is substantially the same as the smallest external diameter of the valve element 3. In other words, the hollow cylinder forming the wall of the valve element 3 is relatively thin. At both ends, the bore 14 is chamfered to avoid eddying which would increase the flow resistance of the valve 1.

At the side facing the valve seat 13, the outside of the wall of the valve element 3 has a radial projection so that the valve element 3 here has a larger diameter than the inlet aperture 6. At the side abutting the valve seat 13 in the rest position, the projection 15 is bevelled. The inclination of the bevel relatively to the longitudinal axis of the pressure limiting valve 1 is from 20° to 80°. On the other side, the projection 15 serves to support the spring 4. Apart from the projection 15, the wall of the valve element 3 is of substantially constant thickness. The bushing 5 has an internal diameter substantially equal to the external diameter of the valve element 3 and serves as a guide for the valve element 3 which is axially displaceable in the bushing 5. It can be sealed from the valve element 3 by an O ring 16. The bushing 5 constricts the internal diameter of the housing 2 on the side of the enlargement remote from the vavle seat 13 to a diameter which is smaller than the diameter of the inlet aperture 6. The bushing 5 simultaneously serves as a second support for the spring 4 so that the latter is clamped between the projection 15 of the valve element 3 and the bushing 5. By changing the position of the bushing 5 in the housing 2, the pre-stressing of the spring 4 is adjustable.

Now, the two ends of the valve element 3 have two engaging surfaces of different size for a pressure obtaining in the pressure limiting valve 1. The larger ($F_E$) of the two surfaces is equal to the cross-sectional area of the inlet aperture 6 minus the cross-sectional area of the bore 14, whereas the smaller ($F_A$) of the two pressure engaging surfaces is determined by the cross-sectional area defined by the internal diameter of the housing 5 minus the cross-sectional area of the bore 14.

With a pressure P obtaining in the valve 1, a force is exerted on the valve element 3 against the force of the spring 4 equal to the product of the pressure P and the difference between the two pressure engaging areas $F_E$-$F_A$. If this force exceeds that of the spring 4, the valve element 3 is moved off the valve seat 13 and a fluid within the valve 1 can flow into the discharge passage 9 through the opening thus created. When the pressure in the valve 1 thereupon drops, the spring 4 moves the valve element 3 back on to the valve seat 13.

Figure 2:
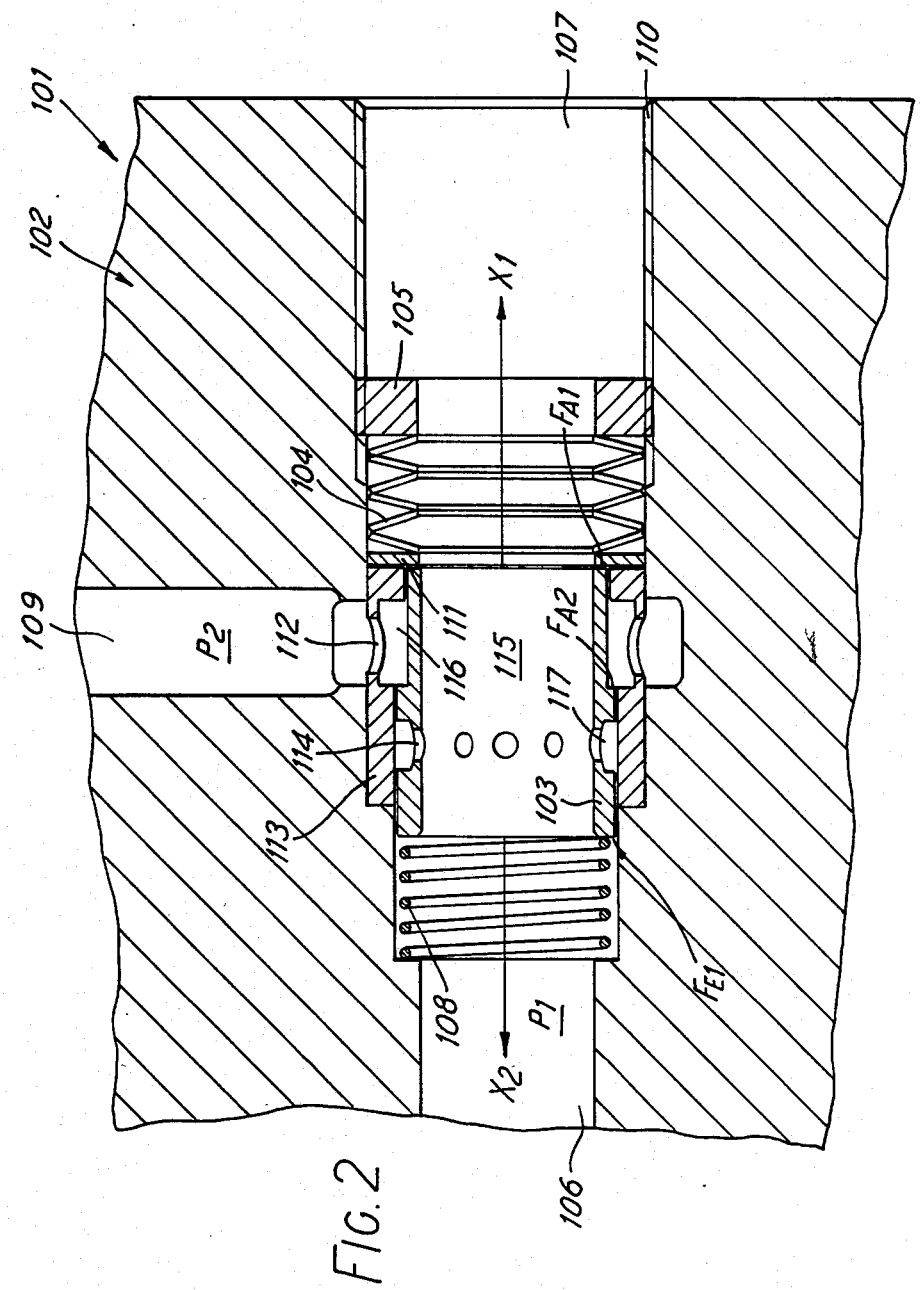
FIG. 2 shows a second embodiment of the pressure limiting valve with a replenishing function.

FIG. 2 illustrates a slide valve 101 working on the same principle. This valve comprises a housing 102, a valve element 103, an over-pressure spring 104 in the form of a plate spring stack, a screw ring 105, a replenishing spring 108, a bushing 113 and a stop ring 111. The housing 102 comprises an inlet aperture 106, an outlet aperture 107 and a discharge passage 109. The bushing 113 is arranged in the housing 102 in the region of the discharge passage 109 and is axially fixed with respect thereto.

The valve element 103 is displaceable in the bushing 113 from a rest position agianst the action of the replensihing spring 108 in one direction and against the action of the over-pressure spring 104 in the other direction. The replenishing spring 108 is supported with its other end agianst the housing 102. The over-pressure spring 104 is supported at one end against a screw ring 105 screwed into an internal screwthread 110 in the outlet aperture 107. The other end acts against the stop ring 111 which, in turn, is pressed against the valve element 103. The mobility of the stop ring 111 in the direction in which the force of the over-pressure spring 104 acts is limited by the bushing 113.

The bushing 113 is substantially hollow cylindrical. Its external diameter corresponds to the internal diameter of the housing 102 in the region of the discharge passage 109. In the interior, the bushing 113 has three different diameters: a first diameter between the stop ring 111 and the discharge passage 109, a second diameter which is larger than the first and is in the region of the discharge passage 109, and a third diameter which is smaller than the first but larger than the second and disposed between the discharge passage 109 and the replenishing spring 108. In the region of the discharge passage 109, the bushing 113 has bores 112 through which a control orifice 116 in the bushing 113, namely the enlargement formed by the second diameter, communicate with the discharge passage 109.

The valve element 103 is a substantially cylindrical body with a throughgoing axial bore 115 of substantially constant diameter. It has two different external diameters respectively corresponding to the first and third internal diameter of the bushing 113. The valve element 103 thus has two different wall thicknesses. The section with the larger wall thickness against which the replenishing spring 108 is pressed has a control orifice 117 consisting of radial bores 114 and an annular groove.

The valve element 103 thus exhibits two pressure engaging surfaces $F_{E1}$ and $F_{A1}$ for a pressure $P_1$ obtaining in the valve 101, whereas it exhibits a pressure engaging surface $F_{A2}$ for a pressure $P_2$ obtaining in the discharge passage 109. The surface $F_{A2}$ is smaller than the pressure engaging surface $F_{E1}$ but need not be so. Its effect can be reduced by an oppositely directed pressure engaging surface on the valve element in the discharge passage.

The force on the valve element 103 is obtained as explained in conjunction with FIG. 1. If, at a pressure $P_1$ in the valve, the force exerted thereby on the valve element 103 exceeds the force of the over-pressure spring 104, the valve element 103 is displaced against the action of the over-pressure spring 104 in the direction of the arrow $X_1$ until the control orifice 117 in the valve element 103 communicates with the control orifice 116. Part of the fluid in the valve 101 can thus flow into the discharge passage 109. If the pressure $P_1$ is reduced, the over-pressure spring 104 pushes the valve element 103 back into its rest position.

On the other hand, if a pressure $P_2$ obtains in the discharge passage 109 which is so large that the force exerted by it on the valve element 103 is larger than the sum of the force exerted by the pressure $P_1$ and the force of the replenishing spring 108, the valve element 103 is displaced in the direction of the arrow $X_2$ against the action of the replenishing spring 108 until an orifice is formed in the bushing 113 between the end of the valve element 103 and the control orifice 116, through which fluid in the discharge passage 109 can flow into the valve. After equalisation of the pressure, the replenishing spring 108 pushes the valve element 103 back into its rest position.

The pressure limiting valve can therefore respond in a hydraulic conduit at a pressure as well as at a vacuum. The response values can be adapted to particular conditions by selecting the area ratios for the pressure engaging surfaces and/or by selecting the spring forces.

I claim:

1. A pressure limiting valve, comprising a housing having wall means defining an interior chamber, an inlet aperture opening to said chamber, an outlet aperture opening to said chamber in axial spaced relationship to the opening of the inlet aperture to the chamber and a discharge passage opening to the chamber axially between the opening of the inlet and outlet apertures to the chamber, a valve element movable in one direction within the chamber from a first position blocking fluid communication between both of said apertures and the discharge passage to a second position permitting fluid communication between at least one of said apertures and the discharge passage, spring means acting between the valve element and the housing for resiliently retaining the valve element in its first position, the valve element having a pressure engaging first surface which with pressure applied thereagainst acts to move the valve element in the same direction that the spring means acts to move the valve element, and an oppositely disposed pressure engaging second surface that is larger than the pressure engaging first surface.

2. A pressure limiting valve according to claim 1, characterized in that the housing wall means at the opening of the inlet aperture to the chamber defines a valve seat, and that the valve element has an enlarged diametric flange portion abuttable against the valve seat for blocking fluid communication between the inlet aperture and the discharge passage, the spring means abutting against said flange portion.

3. A pressure limiting valve according to claim 1, characterized in that housing wall means defines an internally threaded portion and that the spring means includes a bushing threadedly mounted by the threaded portion and serving as a guide element for the valve element and a spring surrounding the valve element and acting against the bushing for urging the valve element to the valve element first position.

4. A pressure limiting valve according to claim 1, characterized in that the valve element is a cylinder element having a bore extending axially therethrough with one end opening to the inlet aperture and a second end opening to the outlet aperture.

5. A pressure limiting valve according to claim 4, characterized in that the cylinder element has an inner diameter that is greater than half the diameter of the inlet aperture.

6. A pressure limiting valve according to claim 4, wherein the discharge passage opens to the chamber through a radial bore that is axially intermediate the inlet and outlet apertures, characterized in that the valve element has at least one radial control orifice that in the valve member second position places the cylinder element bore in fluid communication with the radial bore through the control orifice.

7. A pressure limiting valve according to claim 4, characterized in that there is provided second spring means acting between the valve element and the housing for resiliently urging the valve element to move in said one direction, the valve element being movable in a direction opposite said one direction from its first position to permit fluid communication between said chamber and said discharge passage.

8. A pressure limiting valve according to claim 7, characterized in that the valve element has a pressure engaging third surface which with pressure applied thereto acts in the same sense as the pressure engaging first surface, the discharge passage in the valve element first position being in fluid communication with the third surface.

9. A pressure limiting valve according to claim 8, characterized in that the cylinder element throughout its axial length has at least two wall portions of different wall thicknesses, the thinner wall portion being disposed to have the discharge passage open thereto when the valve element is in its first position and the thicker wall portion having a radial control orifice opening therethrough, and that there is providing a bushing surrounding the valve element and having a first annular wall portion of an inner diameter corresponding to the outer diameter of the valve element thicker wall portion to block fluid communication between the chamber and discharge passage through the control orifice when the valve element is in its first position, and a second wall portion that is of a smaller internal diameter than that of the first wall portion and has a radial bore through which the discharge passage opens to the control orifice when the valve element is in its second position.

10. A pressure limiting valve according to claim 9, characterized in that the bushing has a third wall portion axially opposite the bushing first wall portion from the bushing second wall portion, the third wall portion having an inner diameter that is smaller than the inner diameter of each of the bushing first and second wall portions and that corresponds to the outer diameter of the valve element thinner wall portion.

11. A pressure limiting valve according to claim 9 wherein the first and second means exert resilient forces that the valve element is movable against the action of the second spring means to a third position permitting fluid communication between the chamber and discharge passage when the pressure in the discharge passage exerted on the valve element is larger than the sum of the of the force at the inlet aperture and the force of the first spring means, the valve element having an annular shoulder facing axially toward the outlet aperture and with which the discharge passage is in fluid communication when the valve element is in either of its first and second positions.

12. A pressure limiting valve according to claim 11, characterized in that the first spring means includes a stop ring that is axially movable in the chamber and that abuts against one of the valve element, the bushing and the combination of the valve element and the bushing, the said one that the ring abuts against depending upon the position of the valve element, and a spring abutting against the stop ring to resiliently urge the stop ring toward the valve element.

13. A pressure limiting valve operable as soon as a predetermined static pressure within the valve has been exceeded, comprising a housing having wall means defining an interior chamber, an inlet aperture opening to the chamber, a threaded outlet aperture opening to the chamber axially opposite and axially aligned with the opening of the inlet aperture to the chamber and a discharge passage opening to the chamber axially intermediate the opening of the inlet and outlet apertures to the chamber, a valve element mounted in the chamber for movement from a datum first position blocking fluid communication between the chamber and the discharge passage and a second position permitting fluid communication between the chamber and the discharge passage, an annular bushing threaded into the chamber and the discharge passage, and spring means including a spring portion acting against the bushing for resiliently urging the valve element to the valve element first position, the valve member having a bore extending axially therethrough and axially oppositely disposed first and second pressure engaging surfaces that respectively face the inlet aperture and the outlet aperture, the second pressure engaging surface being smaller than the first pressure engaging surface and the valve element bore being of a larger diameter than half of diameter of the inlet aperture.

14. A pressure limiting valve according to claim 13, characterized in that the spring means includes means acting between the housing and the valve element for resiliently urging the valve element in a direction opposite the movement of the valve element from its first position to the valve element second position to a third position for placing the chamber in fluid communication with the discharge passage.

15. A pressure limiting valve according to claim 14, characterized in that the valve element has an annular pressure engaging surface facing toward the outlet aperture and to which the discharge passage opens when the valve element is in the valve element first position.

16. A pressure limiting valve according to claim 13, characterized in that the wall means defines a valve seat at the opening of the inlet aperture to the chamber, that the valve element has an annular, enlarged diameter flange portion that abuts against the valve seat when the valve element is in its first position and that the spring means has a second portion abutting against the flange.

17. A pressure limiting valve according to claim 13, characterized in that the first pressure engaging surface is substantially equal to the cross sectional area of the inlet aperture minus the cross sectional area of the bore.

* * * * *